US008731995B2

(12) United States Patent
Sun et al.

(10) Patent No.: US 8,731,995 B2
(45) Date of Patent: May 20, 2014

(54) RANKING PRODUCTS BY MINING COMPARISON SENTIMENT

(75) Inventors: Jian-Tao Sun, Beijing (CN); Jian Hu, Beijing (CN); Christoph Ponath, Woodinville, WA (US); Zheng Chen, Beijing (CN); Ling Bao, Seattle, WA (US); Qionghua Wang, Beijing (CN); Jianmin Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1252 days.

(21) Appl. No.: 12/118,764

(22) Filed: May 12, 2008

(65) Prior Publication Data
US 2009/0281870 A1 Nov. 12, 2009

(51) Int. Cl.
G06Q 30/00 (2012.01)
G06F 17/27 (2006.01)
G06Q 30/02 (2012.01)

(52) U.S. Cl.
CPC ........ G06Q 30/0203 (2013.01); G06Q 30/0282 (2013.01); G06Q 30/0201 (2013.01); G06F 17/275 (2013.01); G06F 17/2775 (2013.01); G06F 17/2785 (2013.01)
USPC .............. 705/7.32; 705/347; 705/7.29; 704/9

(58) Field of Classification Search
CPC .......... G06Q 30/0201; G06Q 30/0203; G06Q 30/0282; G06F 17/275; G06F 17/2775; G06F 17/2785
USPC .................... 705/7, 10, 7.32, 7.29, 345; 704/9
See application file for complete search history.

(56) References Cited

U.S. PATENT DOCUMENTS

| 6,523,026 | B1 * | 2/2003 | Gillis .................... 707/999.003 |
| 7,231,381 | B2 * | 6/2007 | Li et al. ......................... 707/766 |
| 7,246,110 | B1 | 7/2007 | Musgrove et al. |
| 7,546,310 | B2 * | 6/2009 | Tsuboi et al. .......... 707/999.102 |
| 7,558,769 | B2 * | 7/2009 | Scott et al. ....................... 705/10 |
| 7,644,075 | B2 * | 1/2010 | Zeng et al. ............. 707/999.005 |
| 7,689,624 | B2 * | 3/2010 | Huang et al. .................. 707/760 |
| 7,739,261 | B2 * | 6/2010 | Zeng et al. ......................... 704/9 |
| 8,620,906 | B2 * | 12/2013 | Shen et al. .................... 707/723 |
| 2003/0167276 | A1 * | 9/2003 | Simpson et al. .............. 707/102 |

(Continued)

OTHER PUBLICATIONS

Leung et al., "Integrating collaborative filtering and sentiment analysis: A rating inference approach", Aug. 28-29, 2006, Proceedings of the ECAI 2006 Workshop on Recommender Systems, pp. 62-66.*

(Continued)

*Primary Examiner* — Justin M Pats
*Assistant Examiner* — Ivan R Goldberg
(74) *Attorney, Agent, or Firm* — Carole Boelitz; Micky Minhas

(57) ABSTRACT

A method of ranking a plurality of products includes obtaining a numerical user score for each of the plurality of products, calculating an opinion score for each of the plurality of products for which a written comparison sentiment applies, determining a final score by combining the numerical user rating and the opinion score for each of the plurality of products, and ranking the plurality of products based on the final score. The opinion score is derived from one or more written comparison sentiments containing a first product name and a second product name. In another aspect, a computer readable medium has instructions stored thereon which, when executed, cause a computer to perform a method of ranking a plurality of products including at least a first product and a second product.

19 Claims, 3 Drawing Sheets

(56) References Cited

U.S. PATENT DOCUMENTS

| | | | |
|---|---|---|---|
| 2005/0034071 | A1 | 2/2005 | Musgrove et al. |
| 2005/0125216 | A1* | 6/2005 | Chitrapura et al. ............... 704/1 |
| 2006/0069589 | A1 | 3/2006 | Nigam et al. |
| 2006/0143158 | A1 | 6/2006 | Ruhl et al. |
| 2006/0200341 | A1 | 9/2006 | Corston-Oliver et al. |
| 2006/0200342 | A1* | 9/2006 | Corston-Oliver et al. ...... 704/10 |
| 2006/0242040 | A1 | 10/2006 | Rader |
| 2007/0038620 | A1 | 2/2007 | Ka et al. |
| 2007/0192170 | A1* | 8/2007 | Cristol ............................ 705/10 |
| 2007/0208701 | A1 | 9/2007 | Sun et al. |
| 2007/0282867 | A1 | 12/2007 | McAllister et al. |
| 2007/0294127 | A1 | 12/2007 | Zivov |
| 2008/0097758 | A1* | 4/2008 | Li et al. ......................... 704/240 |
| 2008/0215543 | A1* | 9/2008 | Huang et al. ...................... 707/3 |
| 2008/0215571 | A1* | 9/2008 | Huang et al. ...................... 707/5 |
| 2008/0249764 | A1* | 10/2008 | Huang et al. ...................... 704/9 |
| 2008/0270116 | A1* | 10/2008 | Godbole et al. .................. 704/9 |
| 2009/0048823 | A1* | 2/2009 | Liu et al. .......................... 704/9 |
| 2009/0083096 | A1* | 3/2009 | Cao et al. .......................... 705/7 |
| 2009/0119157 | A1* | 5/2009 | Dulepet ......................... 705/10 |
| 2009/0164266 | A1* | 6/2009 | Lakhani et al. ................... 705/7 |
| 2009/0319342 | A1* | 12/2009 | Shilman et al. ................. 705/10 |
| 2010/0125484 | A1* | 5/2010 | Chen et al. ...................... 705/10 |
| 2010/0185569 | A1* | 7/2010 | Hu et al. ......................... 706/12 |
| 2013/0268457 | A1* | 10/2013 | Wang et al. ................... 705/347 |

OTHER PUBLICATIONS

Blair-Goldensohn et al., "Building a sentiment summarizer for local service reviews," Apr. 22, 2008, Beijing, China, In WWW Workshop on NLP in the Information Explosion Era.*

Titov et al., "A joint model of text and aspect ratings for sentiment summarization," Jun. 2008, In Proceedings of ACL, p. 308-316.*

Hill, "Statistics: Methods and Applications," 2006, StatSoft, Inc., p. 71.*

Scheible et al., "Towards a Computational Treatment of Superlatives," Jun. 2007, In Proceedings of the Student Research Workshop ACL 2007, pp. 67-72.*

Bos et al., "An Empirical Approach to the Interpretation of Superlatives," Jul. 2006, Conference on Empirical Methods in Natural Language Processing, pp. 9-17).*

Leung, "Integrating collaborative filtering and sentiment analysis: A rating inference approach," Aug. 28-29, 2006, Proceedings of the ECAI 2006 Workshop on Recommender Systems.*

Jindal, "Mining Comparative Sentences and Relations," 2006, Proceedings, The 21st National Conference on Artificial Intelligence, pp. 1-6.*

Hill, Statistics: Methods and Applications, 2006, StatSoft, Inc., pp. 70-76 and 117-120.*

Gopal, "Distance Metric Learning through Optimization of Ranking," 2007, 7th IEEE International Conference on Data Mining Workshops, pp. 201-206.*

Bialik, "Understanding How A Current Kids' Flick Can Beat Out de Sica," Oct. 5, 2007, The Wall Street Journal.*

Ghose, et al., "Designing Ranking Systems for Consumer Reviews: The Impact of Review Subjectivity on Product Sales and Review Quality", Proceedings of the ninth international conference on Electronic commerce, Year of Publication: 2007, pp. 303-310, ACM New York, NY, USA.

Popescu, et al., "Extracting Product Features and Opinions from Reviews", Proceedings of the conference on Human Language Technology and Empirical Methods in Natural Language Processing, Year of Publication: 2005, pp. 339-346, Association for Computational Linguistics Morristown, NJ, USA.

Dave, et al., "Mining the Peanut Gallery: Opinion Extraction and Semantic Classification of Product Reviews", Proceedings of the 12th international conference on World Wide Web, Year of Publication: 2003, pp. 519-528, ACM New York, NY, USA.

Morinaga, et al., "Mining Product Reputations on the Web", Conference on Knowledge Discovery in Data, Proceedings of the eighth ACM SIGKDD international conference on Knowledge discovery and data mining, Year of Publication: 2002, pp. 341-349, ACM New York, NY, USA.

Bialik, Carl, "Understanding How a Current Kids' Flick can Beat Out de Sica", Webpage Available at http://online.wsj.com/public/article/SB119153813516649500.html.

Cao, et al., "Learning to Rank: From Pairwise Approach to Listwise Approach", vol. 227, Proceedings of the 24th international conference on Machine learning, Year of Publication: 2007, pp. 1-9, ACM New York, NY, USA.

Chakrabarti, et al., "Ranking Objects by Exploiting Relationships: Computing Top-K over Aggregation", Proceedings of the 2006 ACM SIDMOD international conference on Management of data, Year of Publication: 2006, pp. 371-382, ACM New York, NY, USA.

Cui, et al., "Comparative Experiments on Sentiment Classification for Online Product Reviews", Proceedings of the Twenty-First National Conference on Artificial Intelligence (AAAI-06), Boston, Massachusetts, Year of Publication: 2006, pp. 1-6.

Freund, et al., "An Efficient Boosting Algorithm for Combining Preferences", Proceedings of the Fifteenth International Conference on Machine Learning, Year of Publication: 1998, pp. 1-37, Morgan Kaufmann Publishers Inc. San Francisco, CA, USA.

Jindal, et al., "Identifying Comparative Sentences in Text Documents", Proceedings of the 29th annual international ACM SIGIR conference on Research and development in information retrieval, Year of Publication: 2006, pp. 244-251, ACM New York, NY, USA.

Jindal, et al., "Mining Comparative Sentences and Relations", Proceedings, The Twenty-First National Conference on Artificial Intelligence and the Eighteenth Innovative Applications of Artificial Intelligence Conference, Year of Publication: 2006, pp. 1-6.

Kleinberg, Jon M., "Authoritative Sources in a Hyperlinked Environment", Journal of the ACM (JACM), vol. 46, Issue 5 (Sep. 1999), pp. 1-34, ACM New York, NY, USA.

Liu, et al., "Opinion Observer: Analyzing and Comparing Opinions on the Web", International World Wide Web Conference, Proceedings of the 14th international conference on World Wide Web, Year of Publication: 2005, pp. 342-351, ACM New York, NY, USA.

McCallum, et al., "A Comparison of Event Models for Naive Bayes Text Classification", Proceedings of the AAAI-98 Workshop on Machine Learning for Text Categorization, Year of Publication: 1998, pp. 1-8.

Mei, et al., "Topic Sentiment Mixture: Modeling Facets and Opinions in Weblogs", International World Wide Web Conference, Proceedings of the 16th international conference on World Wide Web, Year of Publication: 2007, pp. 1-19, ACM New York, NY, USA.

Ng, et al., "Stable Algorithms for Link Analysis", Annual ACM Conference on Research and Development in Information Retrieval, Proceedings of the 24th annual international ACM SIGIR conference on Research and development in information retrieval, Year of Publication: 2001, pp. 258-266, ACM New York, NY, USA.

Page, et al., "The PageRank Citation Ranking: Bringing Order to the Web", Technical report, Stanford Digital Libraries, Year of Publication: 1998, pp. 1-17.

Pang, et al., "Seeing Stars: Exploiting Class Relationships for Sentiment Categorization with Respect to Rating Scales", Annual Meeting of the ACL, Proceedings of the 43rd Annual Meeting on Association for Computational Linguistics, Year of Publication: 2005, pp. 115-124, Association for Computational Linguistics Morristown, NJ, USA.

Qin, et al., "A Study of Relevance Propagation for Web Search", Annual ACM Conference on Research and Development in Information Retrieval, Proceedings of the 28th annual international ACM SIGIR conference on Research and development in information retrieval, Year of Publication: 2005, pp. 408-415, ACM New York, NY, USA.

Nie, et al., "Object Level Ranking: Bringing Order to Web Objects", International World Wide Web Conference, Proceedings of the 14th international conference on World Wide Web, Year of Publication: 2005, pp. 567-574, ACM New York, NY, USA.

* cited by examiner

RANKING PRODUCTS BY MINING COMPARISON SENTIMENT

BACKGROUND

Product search systems are often utilized by users who want to research products online. Ranking products is essential for product search systems as well as online shopping Web sites. Most of these systems employ user rating scores to rank the products. However, using the typical 5 star rating scale, it is difficult to differentiate some products, since several products may have similar rating scores or may be rated following differing criteria.

Internet product searches are used to help Web users research and buy products. Search engine companies have developed a variety of different product search systems. These vertical search engines increase the fierce competition of the online shopping market. Many shopping Web sites are already widely used.

In both product search and online shopping systems, a common function is to rank products according to the preference of end users. Since most of these Web sites allow users to give rating scores (typically from 1 to 5 stars) for products, the typical product ranking approach is based on the average score of all ratings given by end users for each product. However, a problem is that the typical 5 star rating scale makes it difficult to differentiate some comparable products. For example, it is common for the first results page of a search to be dominated by products with 4.5 to 5 star ratings. Under the circumstances, it is unclear which products are better than others in light of such close rating scores. Moreover, the review ratings may be assigned following different criteria of different end users. Some users tend to give higher ratings while others consistently offer lower ratings; thus, it is not reliable to rank products based solely on numerical user ratings.

The discussion above is merely provided for general background information and is not intended for use as an aid in determining the scope of the claimed subject matter.

SUMMARY

In one aspect, a method of ranking a plurality of products includes obtaining a numerical user score for each of the plurality of products, calculating an opinion score for each of the plurality of products for which a written comparison sentiment applies, determining a final score by combining the numerical user rating and the opinion score for each of the plurality of products, and ranking the plurality of products based on the final score. The opinion score is derived from one or more written comparison sentiments containing a first product name and a second product name.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

This disclosure describes embodiments of a novel approach that leverages direct product comparisons in product reviews to provide a relative product ranking. Direct product comparisons that contain users' subjective preferences are referred to as "comparison sentiment."

Figure 1:
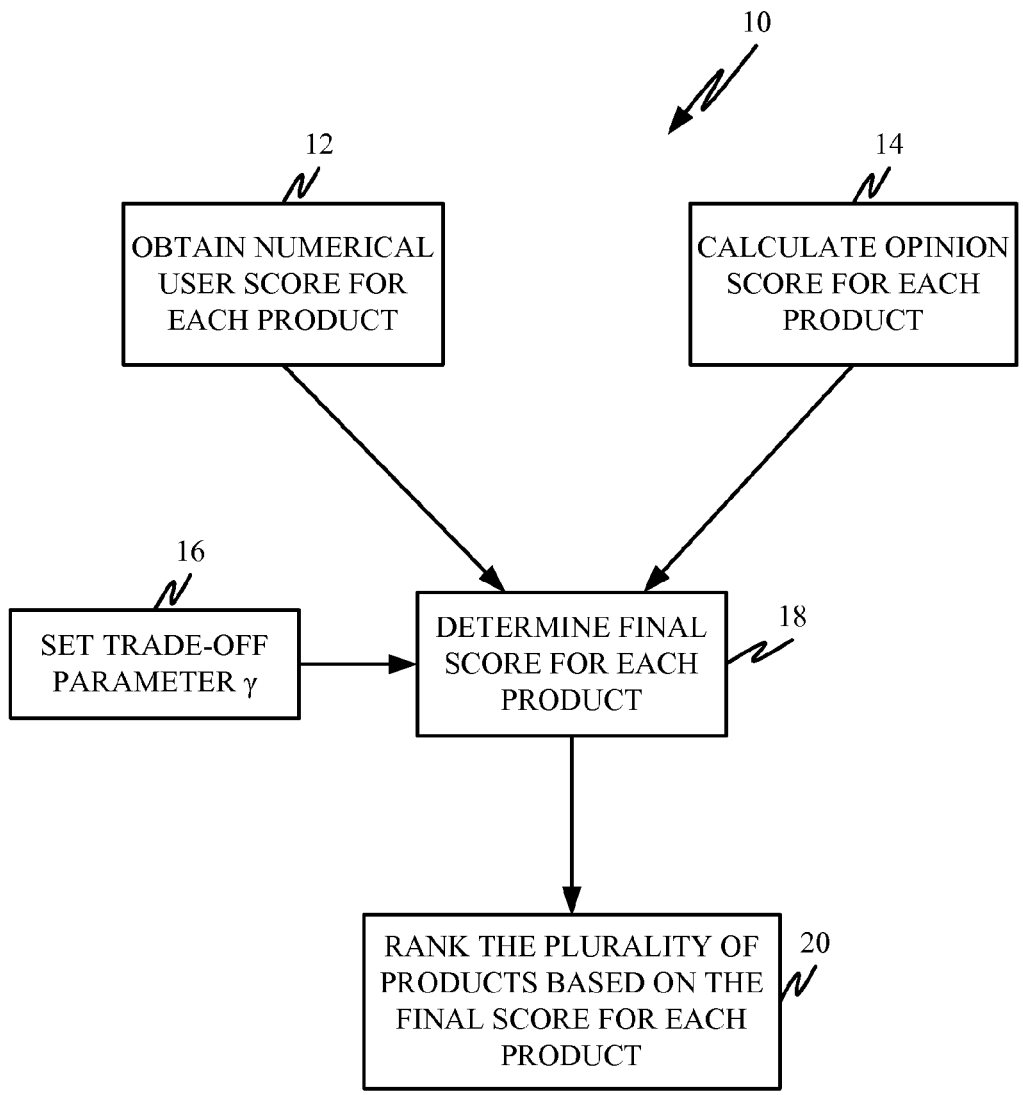
FIG. 1 is a flow chart diagram illustrating steps carried out in an exemplary disclosed method.

FIG. 1 is a flow chart diagram illustrating steps carried out in an exemplary disclosed method. An exemplary method 10 of the present disclosure obtains a numerical user rating score for each of a plurality of products in step 12. In step 14, the method adopts a supervised learning approach to detect user preferences in written reviews and calculates an opinion score for each product. At step 16, a trade-off parameter $\gamma$ (discussed further below) is set to relatively weigh the numerical score and the opinion score. Then, both the user preferences as expressed in written reviews and numerical rating scores are combined in step 18 to provide a final score for each product. In step 20, the final score for each of the plurality of products is used to produce a relative product ranking.

Evaluation of the method 10 shows that comparison sentiment is helpful for product ranking and that the described approach achieves better ranking results from step 20 than ranking purely based on rating scores.

Besides the rating scores obtained in step 12, most product search and shopping sites also allow users to write a review article to express their opinions about a product. Since review articles provide more detailed information about user likes and dislikes, it is desirable to incorporate them to rank products. Some users directly compare products with preferences in their reviews. For example, a user may write "I suggest you buy Canon 5D instead of 40D," which means that the "Canon 5D" is ranked higher than the "40D" in the user's mind. In one example, about 24% of about 2,000 digital camera reviews crawled from Amazon.com include direct comparisons between products. This kind of direct comparison provides supplementary information for user ratings and is helpful for differentiating products.

This disclosure sets forth an algorithm to incorporate both user ratings and written user reviews to provide a better relative ranking of products. In one embodiment, the algorithm works as follows. First, a supervised learning approach is adopted to detect the user preferences between products if there exist reviews that compare them directly. Then, the user preference information is incorporated with the numerical user rating into an optimization problem: the user preferences are used to adjust the rating score of each product to determine a final score in step 18. As a result, the final ranking of step 20 not only characterizes users' overall opinion about individual products, but also reflects the user preferences expressed in reviews. In an exemplary embodiment, the optimization problem is solved by a gradient descent algorithm. To evaluate the effectiveness of the disclosed ranking algorithm, a set of products, in this case digital cameras, were manually labeled and used as ground truth data in experiments. The experimental results show that the described ranking method 10 outperforms product ranking based only on numerical ratings.

Some conventional systems rank products based on popularity or rank reviews based on usefulness. In contrast, the method of the present disclosure ranks products based on the analysis of written user opinion data.

Mining opinions from the Web has attracted much attention from both research and industry areas. Previous research work on sentiment classification does not study the comparison sentiment between products. One related work is the study of comparative sentences. One study proposes a pattern-based approach to identify comparative sentences from text documents and mine comparative sentences that express a relation based on similarities or differences between objects. They group comparatives into four types: Non-equal gradable, equative, superlative and non-gradable.

In contrast, in the disclosed method 10, sentences that compare two products are classified by a supervised machine learning approach according to users' subjective preferences. A ranking algorithm is applied to the user's preferences between two products. To collect such comparisons, comparison content is extracted from user reviews and users' preferences are automatically classified. The comparison sentiment is not limited to comparative sentences. Moreover, comparative sentences not containing comparison sentiment are ignored. Thus, the described method is different from the task of comparative sentence identification.

In one embodiment of a method, let $P=\{p_1, p_2, \ldots, p_n\}$ be a set of products to be ranked, e.g., a set of Canon digital cameras with prices ranging from $200 to $500, or a group of seafood restaurants. The task of product ranking is to assign a score $y_i \in R$ for each object p; thus, $Y=\{y_1, y_2, \ldots, y_n\}$ is used as the criteria for ranking products.

Different ranking criteria correspond with different ranking methods. In current product search and shopping systems, $y_1$ can be the attribute value of products, e.g., price, screen size of a cellphone or pixel count of a digital camera. $y_1$ can also be the relevance score between the search query submitted by users and the title/description of products. However, these ranking methods do not reflect the subjective property of products.

In one embodiment, the method ranks products based on user opinion characterized by numerical user ratings and written user reviews. Thus, $y_1$ in the disclosed method 10 is a score measuring the satisfaction of users towards products. If $y_i > y_j$, it means that users are more satisfied with $p_i$ than $p_j$ and $p_i$ should be ranked higher than $p_j$. For the sake of simplicity, the method illustratively considers opinion data to compute a ranking score without consideration of product price or features. For example, if an expensive professional digital camera has many negative reviews and 1-2 star ratings, it may have a lower ranking than a low-end camera having many positive reviews, even though the professional camera may in some views be the better camera.

Many internet sites allow users to give ratings, commonly by assigning a number of stars, for products to characterize the overall user opinion. Thus, the products can be ranked based on a simple average: add the total number of stars and divide it by the number of votes:

$$avgR(p_i) = \frac{\sum_{r=1}^{r_m} r \cdot v_r(p_i)}{\sum_{r=1}^{r_m} v_r(p_i)} \qquad \text{Eq. 1}$$

In Equation 1, $p_i$ is a product; $r_m$ is the maximum allowed rating, usually 5 or 10 stars; $v_r(p_i)$ is the number of votes with rating r given to product $p_i$. $avgR(p_i)$ denotes the average rating for product $p_i$ and is used as its numerical user rating score.

A limitation of Equation 1 is that it does not consider the popularity of user votes. For example, if two users awarded one restaurant the maximum 5 stars, while 100 users rated another restaurant with an average of 4.8 stars, it does not make sense to regard the first restaurant better than the second one. Generally, a restaurant with more ratings is likely to have a more reliable resultant rating. For this reason, some sites use a Bayesian weighted ranking method, for example:

$$avgR_B(p_i) = \frac{\sum_{r=1}^{r_m} r \cdot v_r(p_i) + \overline{v} \cdot \overline{r}}{\sum_{r=1}^{r_m} v_r(p_i) + \overline{v}} \qquad \text{Eq. 2}$$

In Equation 2, $\overline{v}$ and $\overline{r}$ are the average vote count and average rating of all products, respectively. The weighted score $avgR_B(p_i)$ is used for ranking products. In the Bayesian averaging method, each product is assigned with an average vote count and an average rating. When a new user rates a product, its ranking score will change slightly. Using the above restaurant example and assuming $\overline{r}=4.5$ and $\overline{v}=50$, we have $avgR_B(p_1)=4.52$ and $avgR_B(p_2)=4.70$. Thus, the above problem of ranking based on simple averaging is alleviated.

Ranking products based on user rating, the numerical score obtained in step 12, is quite straight-forward. However, this approach has at least two drawbacks:

First, product ratings often fall within a small range and it is not easy to understand how much better one individual product is compared with other products. Thus, it can be difficult to distinguish products based on average rating alone.

Second, some users tend to assign higher ratings while others consistently offer lower ratings. Even in the case of a product rating by only one specific user, the rating score may also vary in different cases. For example, a user may give product a 5-star rating when only that product is rated. However, if the user is asked to first compare product A with a group of comparable products and then rate all of them, the rating for product A may not be 5 stars. This is because user ratings are subjective and can be impacted by other factors. Thus, it is not reliable to rank products only based on user rating scores.

Thus, an exemplary embodiment of the disclosed method 10 ranks products based on both user ratings in step 12 and user reviews in step 14. In developing the disclosed method 10, a group of product reviews was crawled from the internet. From these reviews, candidate review sentences which may make comparisons between products were identified. Then, a supervised machine learning approach was implemented to automatically identify user preference between two products.

An example candidate sentence follows: "I suggest you buy a Canon 5D instead of a 40D." An algorithm of the disclosed method will classify the user preference as "Cannon 5D>Canon 40D." The user preference information gleaned from user reviews is transformed into an opinion score. The opinion score is combined with the numerical user rating score in step 18 an optimization problem to estimate a more meaningful final score for each product, which will be used in step 20 as the criteria to rank the products.

Review articles are posted by internet users to express their opinions about products. In a review article, sentences or phrases can be divided into two types: objective and subjective. Subjective sentences or phrases are used to express user opinion, while objective sentences or phrases do not convey such information. For example, "I have gone through two Apple iPod nanos before this one" is an objective sentence, while "I prefer the older nano's longer body" is a subjective sentence. Some subjective sentences are used to express user opinion toward an individual product while others make comparisons between products. Those that contain comparison sentiment can be used in the disclosed method 10 to rank products in step 20.

There are different types of comparative sentences, that are related to but different from comparison sentiment. Comparative sentences may be detected according to sentence type. For example, if a sentence has comparative or superlative form, it will be regarded as a comparative sentence. Following are two example sentences to clarify the differences between comparison sentiment and comparative sentences:

1. "After reading the manual, I discovered that Product1 has a lot of features that Product2 doesn't have." This sentence is illustratively not a comparative sentence. However, it does contain user comparison sentiment: the author of this sentence prefers Product1.

2. "Product1 is the best one I've ever seen." This is illustratively a superlative comparative sentence. However, it contains user sentiment about an individual product. It does not convey comparison sentiment, or relative preference with respect to another product, and is therefore not usable in the disclosed method for contributing to an opinion score.

In an exemplary embodiment of the disclosed method 10, when product reviews are crawled, product names are also gathered, thereby allowing for production of a list of product names. If a written user review mentions two products from the product name list, the review contains a candidate sentence for having user comparison sentiment.

Other research has recently focused on sentiment classification, which is to predict sentiment polarity (e.g., positive, negative or neutral) for a review or a sentence. Comparison sentiment classification is different: the task is to understand if there exists user preferences between two products.

Figure 2:
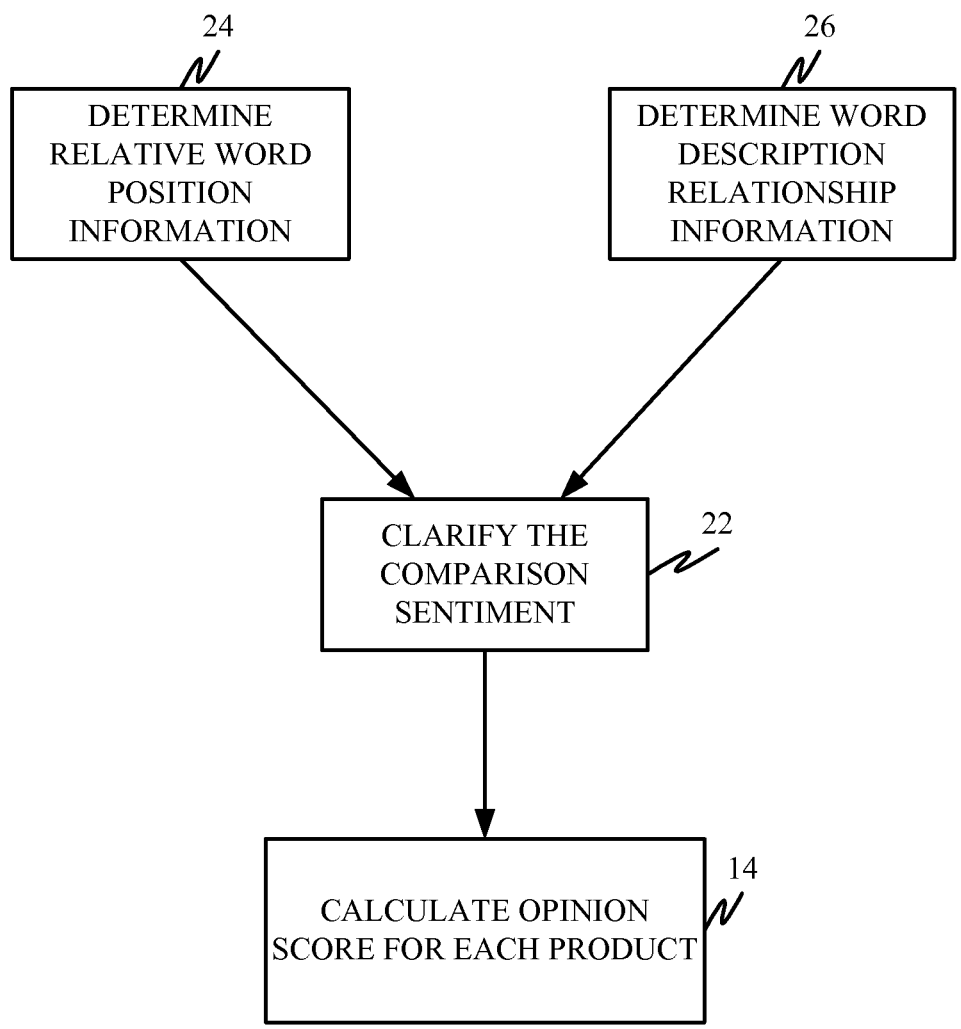
FIG. 2 is a flow chart diagram illustrating steps carried out in an exemplary opinion score calculation method.

FIG. 2 is a flow chart diagram illustrating steps carried out in an exemplary opinion score calculation method. Given a sentence applying to two products $p_i$ and $p_j$, the task of comparison sentiment classification is to assign one category for the sentence from the following three categories in step 22:

$p_i>p_j$: $p_i$ is preferred over $p_j$
$p_i<p_j$: $p_j$ is preferred over $p_i$
Other: no sentiment preference between $p_i$ and $p_j$ Sentences and phrases falling in the first two categories are helpful for product ranking. The third category means that the user does not express a sentiment of preference between $p_i$ and $p_j$. Following are example sentences for each comparison sentiment category:

$p_i>p_j$: The $p_i$ is a definite upgrade from the $p_j$.
$p_i<p_j$: I had my heart set on the $p_i$ until $p_j$ came out.
Other: We took the $p_i$ and the $p_j$ on a major trip to the Canadian Rockies.

Comparison sentiment classification in step 22 is different from traditional document classification or sentiment classification problems. One difference is that most of the prior classification systems adopt bag-of-words methods to represent a sentence or document. In contrast, the disclosed method uses relative word position information, which may be crucial for comparison sentiment classification. Determining relative position information for a selected word is accomplished in step 24. Here are several example sentences:

$p_i>p_j$: $p_i$ is better than $p_j$.
$p_i<p_j$: $p_i$ is new, but I still think $p_j$ is better.
Other: I owned $p_i$ and $p_j$, but my suggestion is that you'd better not buy either of them.

In the above three sentences, the selected word "better" is located at different positions and has different meanings for expressing comparison sentiment of the two products. For each word, if it is not part of a product name, it will have three possible relative positions: before (Pos1), between (Pos2), or after (Pos3) the two product names. For instance, in the first sentence, the word "better" is between $p_i$ and $p_j$.

Besides word position, the descriptive relationship between words and products is also useful for comparison sentiment classification. Determining word description relationship information for a selected word is accomplished in step 26. In the second sentence, the word "better" describes $p_j$ instead of $p_i$. In one example of trained data, a word is regarded as describing product $p_i$ if the word and $p_i$ are not separated by a comma. Each word has four descriptive relations: only for $p_1$ (Desc1), only for $p_2$ (Desc2), for both $p_1$ and $p_2$ (Desc3) and for neither $p_1$ nor $p_2$ (Desc4).

To incorporate the above two kinds of information, we construct three types of features:

Words expanded by relative position information, denoted by W-Pos.
Words expanded by descriptive relationship information, denoted by W-Desc.
Words expanded by both position and descriptive relationship information, denoted by W-Pos-Desc.

For instance, in the first sentence, "better" is expanded as "better-Pos2", "better-Desc3" and "better-Pos2-Desc3"; in the second sentence, "better" is expanded as "better-Pos3", "better-Desc2", and "better-Pos3-Desc2"; in the third sentence, it is expanded as "better-Pos3", "better-Desc4" and "better-Pos3-Desc4". Similarly n-grams (n≥2) and the corresponding expanded position and description features can be constructed.

Each sentence can be represented by a feature vector:

$$s=[f_1:n_1, f_2:n_2, \ldots, f_p:n_p]  \quad \text{Eq. 3}$$

where $f_p$ is the p-th feature and $n_p$ is the frequency of feature $f_p$ occurrence in sentence s. $f_p$ can be different types of features: W, W-Pos, W-Desc or W-Pos-Desc. W denotes original selected word features without expansion. W-Pos-Desc features achieve the best classification accuracy, followed by W-Pos and then W-Desc and finally W.

A group of sentences are manually labeled into comparison sentiment categories and are represented by the feature vectors. With these labeled sentences as training data, in one embodiment, a Support Vector Machine (SVM) algorithm is applied to train a classifier. The classifier can then be used to predict the categories for unseen sentences. SVM is used because it has demonstrated promising accuracy in many classification tasks. Linear kernels and all the default parameters are adopted. In an exemplary embodiment, the classifier returns a listing of the sentences containing comparison sentiment so that a user can read the sentences applying to two products of interest.

In one embodiment, both numerical user ratings and automatically classified comparison sentiment are leveraged to produce final ranking scores in step 18. In one example, twenty reviewers may support $p_i>p_j$ and only one reviewer supports $p_i<p_j$. In that case, it is reasonable to rank $p_i$ higher than $p_j$. However, in other cases the preference relations may be sparse. That is, if a group of reviews mention N products, there may exist much fewer than N(N−1) pairs of distinct comparisons between products. Thus, comparison sentiment alone may be not enough for ranking products. To solve this problem, the disclosed method is a unified product ranking approach in which both numerical user ratings and comparison sentiment are taken into consideration.

The solution can be formulated as minimizing the following function:

$$F(Y) = \gamma \sum_{i,j} w_{ij} e^{-(y_i - y_j)} + (1-\gamma) \sum_i (y_i - r_i)^2, \quad \text{Eq. 4}$$

$$0 \leq \gamma \leq 1$$

$$Y^* = \arg\min_{Y \in R^N} F(Y) \quad \text{Eq. 5}$$

In Equation 4, $y_i$ is the opinion score assigned to product $p_i$. The task is to estimate $Y=[y_1, y_2, \ldots, y_N]$, which corresponds with the opinion scores of all products. $r_i$ is a normalized rating score for product $p_i$. $w_{ij}$ is a normalized score used to measure comparison sentiment of product $p_i$ and $p_j$. Given a group of user reviews, assume there are totally t review sentences containing comparison sentiment, among which $m_{ij}$ sentences are classified as $p_i > p_j$. Thus, Equation 6 gives a reasonable way of setting $w_{ij}$:

$$w_{ij} = \frac{m_{ij}}{t} \quad \text{Eq. 6}$$

avgRComp denotes the unified product ranking algorithm. From Equation 4, the objective function minimizes two objectives:

1) $\Sigma_{i,j} w_{ij} e^{-(y_i - y_j)}$ calculates whether the final opinion scores for all products are consistent with the comparison sentiment reflected in user reviews. For a pair of products $p_i$ and $p_j$, if there are more sentences in reviews that are classified as $p_i > p_j$ rather than $p_j > p_i$, then $p_i$ should be ranked higher than $p_j$. Equation 6 yields $w_{ij} > w_{ji}$, and by minimizing the objective function, $y_i > y_j$ is obtained, which is consistent with the comparison sentiment relation.

2) $\Sigma_i (y_i - r_i)^2$ measures the distance between the final opinion scores and the user rating scores for all products, which means the final ranking scores should not be changed too much from the initial normalized rating scores. While the above two objectives are optimized, $\gamma$ is a trade-off parameter and is set in step 16. If $\gamma$ is set to 0, each product is assigned with its average numerical user rating. Thus, the products are ranked by user rating scores. On the contrary, if $\gamma$ is set to 1, only the comparison sentiment is used to rank products. If $\gamma$ is between 0 and 1, both user rating and user preference information are used to calculate a final score for each product in step 18.

avgR and Comp represent the product ranking algorithms corresponding with $\gamma=0$ and $\gamma=1$, respectively. The value of $\gamma$ can be trained by a relatively small set of labeled data. In Equation 4, $e^{-(y_i - y_j)}$ and $(y_i - r_i)^2$ are convex functions. Here $w_{ij} \geq 0$, $0 \leq \gamma \leq 1$, thus $F(Y) \geq 0$ and $F(Y)$ are also convex functions. Thus, the optimization problem of Equation 5 can be solved by a gradient descent algorithm. In an exemplary experiment, the most accurate final product ranking is achieved when $\gamma=0.8$ in step 16 and both numerical rating and written review information are incorporated for product ranking.

Accuracy of different types of expanding features with W features (n-gram, n≤3) on comparison sentiment classification including n-grams with length n≤3 is illustratively sufficient. When both 2-gram and 3-gram features are included, the accuracy is 70.0%. The accuracy drops when including longer n-grams. This means that 2-gram and 3-gram features can capture some local context information to help classify comparison sentiment. But when n≥4, the sentence representation is too sparse to help the classification.

When words are expanded to construct W-Pos, W-Desc and W-Pos-Desc features, the expansion based on only 1-gram (n=1) is sufficient. For example, the classification accuracy with W-Pos-Desc features expanded from 1-gram is 71.2%. If the same types of features expanded from 2-gram are also included, the classification accuracy drops to 68.0%.

In an exemplary experiment, the best result is obtained by combining W features and W-Pos-Desc features: 74.2%, a 4.2% improvement compared with only W-Pos-Desc features.

Figure 3:
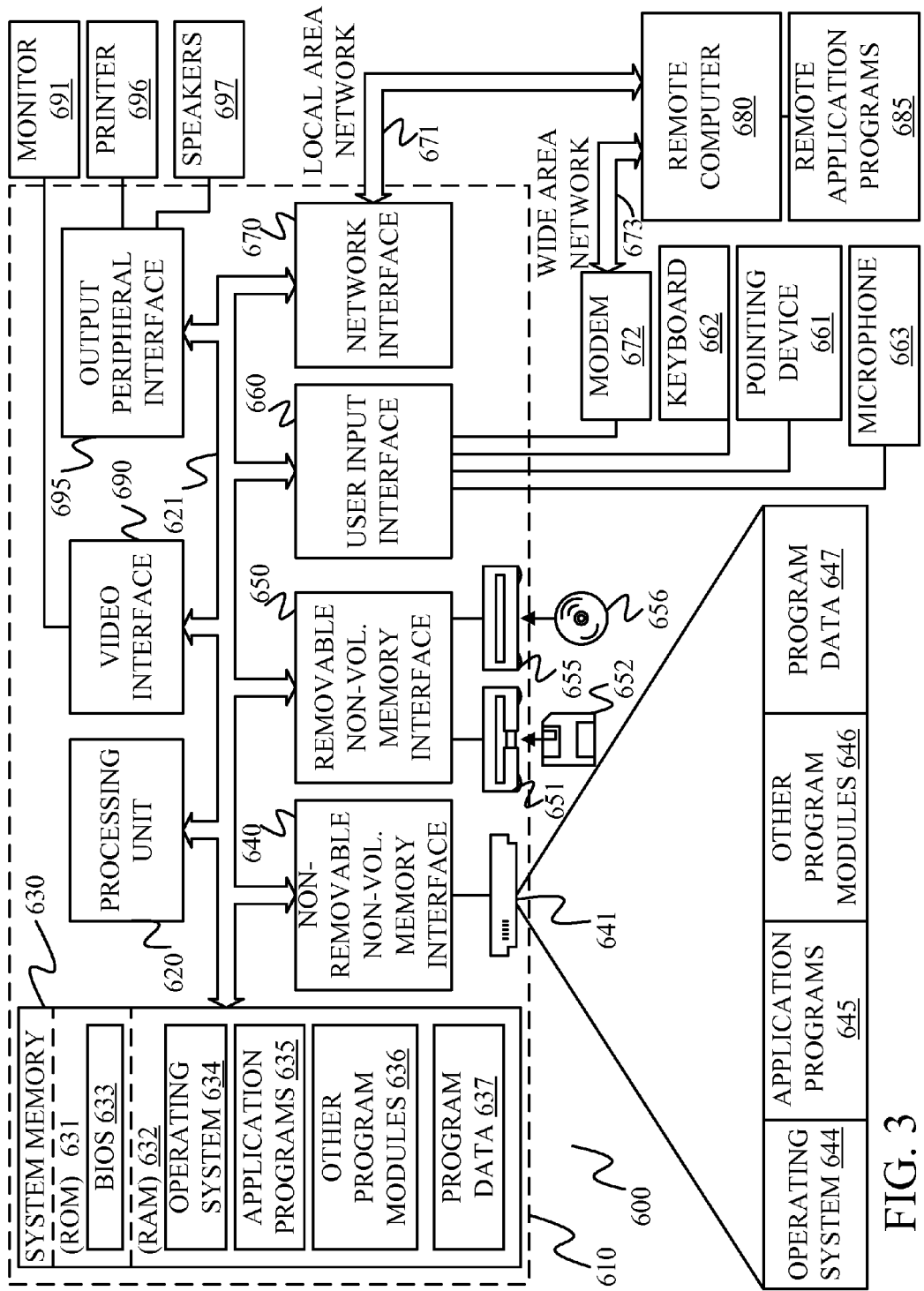
FIG. 3 illustrates an example of a computing system environment.

FIG. 3 illustrates an example of a suitable computing system environment 600 in which embodiments of method 10 may be implemented. The computing system environment 600 is only one example of a suitable computing environment and is not intended to suggest any limitation as to the scope of use or functionality of the claimed subject matter. Neither should the computing environment 600 be interpreted as having any dependency or requirement relating to any one or combination of components illustrated in the exemplary operating environment 600.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments have been described herein are useable in the general context of computer-executable instructions, such as program modules, being executed by a computer. Generally, program modules include routines, programs, objects, components, data structures, etc. that perform particular tasks or implement particular abstract data types. Embodiments can be practiced in distributed computing environments where tasks are performed by remote processing devices that are linked through a communications network. In a distributed computing environment, program modules can be located on both (or either) local and remote computer storage media including memory storage devices.

With reference to FIG. 3, an exemplary system for implementing some embodiments includes a general-purpose computing device in the form of a computer 610. Components of computer 610 may include, but are not limited to, a processing unit 620, a system memory 630, and a system bus 621 that couples various system components including the system memory to the processing unit 620.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610.

Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 3 illustrates operating system 634, application programs 635, other program modules 636, and program data 637. In an exemplary embodiment, applications 635 include ranking method 10. This is but one example of a possible implementation.

The computer 610 may also include other removable/non-removable volatile/nonvolatile computer storage media. By way of example only, FIG. 3 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 3, provide storage of computer readable instructions, data structures, program modules and other data for the computer 610. In FIG. 3, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. This is but one example of a possible implementation.

A user may enter commands and information into the computer 610 through input devices such as a microphone 663, keyboard 662 and a pointing device 661, such as a mouse, trackball or touch pad. Other input devices (not shown) may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 is operated in a networked environment using logical connections to one or more remote computers, such as a remote computer 680. The logical connections depicted in FIG. 3 include a local area network (LAN) 671 and a wide area network (WAN) 673, but may also or instead include other networks The computer 610 is connected to the LAN 671 through a network interface 670. Computer 610 includes a modem 672 or other means for establishing communications over the WAN 673, such as the Internet. The modem 672, which may be internal or external, may be connected to the system bus 621 via the user-input interface 660, or other appropriate mechanism. Remote computer 680 is shown as operating remote applications 685.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of ranking a plurality of products comprising at least a first product and a second product, the method comprising:

obtaining a numerical user score for each of the plurality of products;

obtaining written user reviews pertaining to one or more of the products;

identifying at least one superlative statement from the written user reviews that is determined to include, in terms of product names, only an individual product name and that does not indicate a relative preference between products;

identifying written comparison sentiments from the written user reviews by excluding the identified at least one superlative statement from the written user reviews, each written comparison sentiment containing a direct product comparison between first and second products, the direct product comparison including a first product name and a second product name and describing a subjective user preference of the first product relative to the second product;

calculating an opinion score for each of the plurality of products, based at least in part on the written comparison sentiments;

determining a final score using a computer by combining the numerical user score and the opinion score for each of the plurality of products, wherein a tradeoff parameter is utilized to give a greater weight to the opinion score than the numerical user score in determining the final score; and ranking the plurality of products based on the final score.

2. The method of claim 1, wherein calculating an opinion score comprises classifying the comparison sentiment into one of three categories, indicating either that the first product is preferred over the second product, the second product is preferred over the first product, or that there is no preference sentiment between the first product and the second product.

3. The method of claim 2, wherein classifying the comparison sentiment comprises determining relative position information comprising whether a selected word of the written comparison sentiment occupies one of three positions: either between the first product name and the second product name, before both the first product name and the second product name, or after both the first product name and the second product name.

4. The method of claim 2, wherein classifying the comparison sentiment comprises determining description relationship information comprising whether a selected word of the written comparison sentiment applies to only the first product, only the second product, both the first product and the second product, or neither the first product nor the second product.

5. The method of claim 2, wherein classifying the comparison sentiment comprises:
   determining relative position information comprising whether a selected word of the written comparison sentiment occupies one of three positions: either between the first product name and the second product name, before both the first product name and the second product name, or after both the first product name and the second product name; and
   determining description relationship information comprising whether a selected word of the written comparison sentiment applies to only the first product, only the second product, both the first product and the second product, or neither the first product nor the second product.

6. The method of claim 1, wherein obtaining a numerical user score comprises using a Bayesian weighted averaging method.

7. The method of claim 1, and further comprising:
   setting the trade-off parameter based on a distance between the opinion scores and the numerical user scores of the plurality of products.

8. A computer-implemented method of ranking a plurality of products comprising at least a first product and a second product, the method comprising:
   obtaining a numerical user score for each of the plurality of products;
   obtaining written user reviews pertaining to one or more of the products;
   identifying at least one superlative statement in the written user reviews that is determined to include, in terms of product names, only an individual product name and does not indicate a relative preference between products;
   identifying one or more written comparison sentiments from the written user reviews by excluding the identified at least one superlative statement from the written user reviews, each written comparison sentiment containing a direct product comparison between the first product and the second product, the direct product comparison including a first product name and a second product name and describing a subjective user preference of the first product relative to the second product;
   calculating an opinion score for each of the plurality of products, wherein the opinion scores for the first and second products are calculated by:
      for each of the one or more written comparison sentiments,
         selecting a keyword within the written comparison sentiment;
         determining relative position information for the keyword relative to the first and second product names; and
         determining description relationship information of the keyword relative to the first and second product names; and
         using both the relative position information and the description relationship information to calculate the opinion score;
   determining a final score for each product of the plurality of products using a computer by combining the numerical user score and the opinion score for the product; and
   ranking the plurality of products based on the final score determined for each of the plurality of products.

9. The method of claim 8, wherein a tradeoff parameter is utilized to weight the numerical user score and the opinion score differently in determining the final score.

10. The method of claim 9, wherein the tradeoff parameter gives greater weight to the opinion score than to the numerical user score.

11. The method of claim 8, and further comprising setting a trade-off parameter based on a distance between the opinion scores and the numerical user scores of the plurality of products and determining the final score by weighting the numerical user score and the opinion score using the trade-off parameter for each of the plurality of products.

12. The method of claim 8, wherein determining relative position information comprises:
   determining whether the selected keyword occupies one of three positions: either between the first product name and the second product name, before both the first product name and the second product name, or after both the first product name and the second product name.

13. The method of claim 8, wherein determining description relationship information comprises:
   determining whether the selected keyword of the written comparison sentiment applies to only the first product, only the second product, both the first product and the second product, or neither the first product nor the second product.

14. A hardware computer readable storage medium having instructions stored thereon which, when executed, cause a computer to perform a method of ranking a plurality of products, the method comprising:
   obtaining a numerical user score for each product of the plurality of products;
   calculating an opinion score for each product of the plurality of products from one or more written comparison sentiments containing a direct product comparison between a first product and a second product, the direct product comparison including a first product name and a second product name and indicating a subjective user preference of the first product relative to the second product,
   for each product of the plurality of products, determining a numerical distance between the opinion score and the numerical user score for the product;
   determining an overall numerical distance by summing the numerical distances determined for each of the products;
   setting a trade-off parameter based on the overall numerical distance;
   determining a final score for each product of the plurality of products using the computer by combining the numerical user score and the opinion score for the product,
   wherein the numerical user score and the opinion score are weighted using the trade-off parameter; and ranking the plurality of products based on the final score determined for each product of the plurality of products.

15. The hardware computer readable medium of claim 14, wherein determining whether the first product is preferred over the second product comprises:
selecting a keyword in the written comparison sentiment;
determining relative position information comprising whether the selected word of the written comparison sentiment occupies one of three positions: either between the first product name and the second product name, before both the first product name and the second product name, or after both the first product name and the second product name; and
determining whether the selected keyword applies to only the first product, only the second product, both the first product and the second product, or neither the first product nor the second product.

16. The hardware computer readable medium of claim 14, wherein obtaining a numerical user score comprises using a Bayesian weighted averaging method.

17. The hardware computer readable medium of claim 14, and further comprising:
obtaining written user reviews pertaining to at least one of the first and second products;
identifying at least one superlative statement from the written user reviews that is determined to include, in terms of product names, only an individual product name and the superlative statement does not indicate a relative preference between a plurality of products; and
identifying the one or more written comparison sentiments from the written user reviews by excluding the identified at least one superlative statement from the written user reviews, each written comparison sentiment containing a direct product comparison between the first product and the second product, the direct product comparison including a first product name and a second product name and describing a subjective user preference of the first product relative to the second product.

18. The hardware computer readable medium of claim 14, wherein the tradeoff parameter is utilized to weight the numerical user score and the opinion score differently in determining the final score.

19. The hardware computer readable medium of claim 18, wherein the tradeoff parameter gives greater weight to the opinion score than to the numerical user score.

\* \* \* \* \*